(12) United States Patent
Jansen et al.

(10) Patent No.: US 6,671,189 B2
(45) Date of Patent: Dec. 30, 2003

(54) POWER CONVERTER HAVING PRIMARY AND SECONDARY SIDE SWITCHES

(75) Inventors: Arian Jansen, Thousand Oaks, CA (US); Xiaoyang Zhang, Chatsworth, CA (US)

(73) Assignee: Minebea Co., Ltd. (JP)

( * ) Notice: Subject to any disclaimer, the term of this patent is extended or adjusted under 35 U.S.C. 154(b) by 0 days.

(21) Appl. No.: 10/138,351

(22) Filed: May 3, 2002

(65) Prior Publication Data

US 2003/0090914 A1 May 15, 2003

Related U.S. Application Data

(63) Continuation-in-part of application No. 10/039,373, filed on Nov. 9, 2001, now Pat. No. 6,594,161.

(51) Int. Cl.$^7$ .............................................. H02M 3/335
(52) U.S. Cl. ................................ 363/21.14; 363/21.13; 363/21.15
(58) Field of Search ........................... 363/21.13, 21.12, 363/21.14, 21.02, 21.03, 21.15

(56) References Cited

U.S. PATENT DOCUMENTS

| | | | |
|---|---|---|---|
| 5,594,629 A | 1/1997 | Steigerwald | 363/21.12 |
| 5,608,613 A * | 3/1997 | Jansen | 363/21.03 |
| 5,619,403 A | 4/1997 | Ishikawa et al. | 363/21.04 |
| 5,757,627 A * | 5/1998 | Faulk | 363/21.14 |
| 6,069,804 A | 5/2000 | Ingman et al. | 363/21.12 |
| 6,075,352 A * | 6/2000 | Kates et al. | 323/283 |
| 6,229,717 B1 | 5/2001 | Corral Blanco et al. | 363/21.14 |
| 6,366,480 B2 | 4/2002 | Hosotani et al. | 363/21.14 |

* cited by examiner

*Primary Examiner*—Shawn Riley
(74) *Attorney, Agent, or Firm*—Joel Lutzker; Anna Vishev; Schulte Roth & Zabel LLP

(57) ABSTRACT

A power converter having a transformer with a primary side winding and a secondary side winding, each having a switch. When the primary master switch is switched on, the transformer charges. When it is switched off, the intrinsic capacitance of the secondary slave switch discharges generating the zero voltage switching condition for the secondary slave switch. The secondary slave switch is switched on at a time determined in accordance with the waveform generated by the transformer. When the secondary slave switch is switched on, the transformer discharges and ultimately the charge from an output capacitor flows into the transformer as a backflow which charges the transformer. The secondary slave switch is switched off at a time determined in accordance with a current flowing through said secondary switch. The intrinsic capacitance of primary master switch discharges generating the zero voltage switching condition for primary master switch which is then switched on.

21 Claims, 5 Drawing Sheets

POWER CONVERTER HAVING PRIMARY AND SECONDARY SIDE SWITCHES

RELATED APPLICATIONS

This application is a continuation in part of the U.S. patent application Ser. No. 10/039,373 filed Nov. 9, 2001, now U.S. Pat. No. 6,594,161, and claims all rights of priority thereto.

BACKGROUND OF THE INVENTION

1. Field of the Invention

This invention relates to power converters and more particularly, to switching power converters such as flyback converters.

Conventional power flyback converters draw current from the power source into the primary winding of the transformer. The primary winding current starts at zero and ramps up with a rising edge and is then interrupted when a power switch turns off. The primary winding current then remains zero for an interval. At the point where the primary input current is interrupted, stored energy in the transformer winding causes current to flow in the secondary or output winding of the transformer. In most conventional flyback converters, a rectifier diode is provided on the secondary side of the transformer. The voltage drop across the rectifier diode affects the efficiency of the converter.

Power converters employing transistor power switching devices on the secondary side of the transformer are known such as the high frequency switching circuit disclosed in U.S. Pat. No. 5,594,629 to Steigerwald. The Steigerwald power converter includes a primary side power switching device Q1 and a secondary side power switching device Q2, which are controlled to operate in a natural zero-voltage switching mode such that the power switching devices are switched with zero-voltage across them at the time of switching. The zero-voltage switching capability permits the converter to operate with greater efficiency. The Steigerwald patent fails to disclose the control circuits or operations for causing the switching of the power switching devices Q1 and Q2.

The bi-directional DC to DC power converter disclosed in U.S. Pat. No. 6,069,804 to Ingman et al. includes an output bi-directional switch such as a FET 34. The converter increases efficiency by use of a resonant transition control means for sensing the inductor input and output winding currents and the output voltage and for adjusting the frequency to provide switching of the power switches in a resonant transition mode and to adjust the output voltage to a predetermined level. In the resonant transition mode of operation, the period of the clock circuit is adjusted to provide substantially resonant transitions on both the input and output bi-directional switches. The embodiments of the bi-directional power converter disclosed in the Ingman Patent include a control scheme for the power bi-directional switches in which the primary-side switch and the secondary-side switch are controlled by the same clock circuit 44. The second control signal on signal line 48 controlling the secondary side bi-directional switch has a state that is the compliment of the state of the first control signal on signal line 46 controlling the primary side bi-directional switch. Thus, the control signals for the primary and secondary bi-directional switches are related signals coming from the same control unit. FIG. 9 of the Ingman Patent further illustrates the clock circuit 44 acting as the control unit. More particularly, a transformer 125 drives both the primary and secondary side by directional switches.

SUMMARY OF THE INVENTION

It is an object of the invention to provide a power converter which allows zero-voltage switching on both primary and secondary side switches.

A further object of the invention is to provide a power converter of the variable frequency flyback type with improved efficiency.

It is a further object of the invention to provide a power converter which achieves full zero-voltage switching on primary and secondary side switches combined with synchronous rectification.

It is still a further object of the invention to provide a power converter having primary and secondary side switches which are controlled by separate stand-alone control units.

It is another object of the invention to provide a power converter having primary and secondary side switches which does not have control signals over the isolation barrier and which does not include a secondary transformer which must meet regulatory safety tolerances.

Additionally, it is an object of the invention to provide a power converter having primary and secondary side switches where the secondary side switch is operated as a slave.

It is still another object of the invention to provide a power converter having primary and secondary side switches of the master-slave type where the secondary side switch is controlled following the waveform of the transformer of the power converter.

It is yet another object of the invention to provide a power converter where the transformer of the power converter is allowed to be charged in a reverse direction to a particular level and then switched to be charged in the forward direction.

It is still a further object of the invention to provide a power converter having primary and secondary side switches where the secondary side switch is turned off at a predetermind level of back current.

These and other objects of the invention are accomplished by providing a power converter comprising: a transformer having a primary winding and a secondary winding, a primary side switch, a secondary side switch, a master control unit controlling the switching of the primary side switch, a slave control unit for controlling the switching of the secondary side switch in accordance with a detected backflow current in the secondary side switch.

These objects are further accomplished by providing a power converter comprising: a transformer having a primary side and a secondary side, a primary side power switch, a secondary side power switch, a secondary control unit for controlling the switching of the secondary side power switch which follows the waveform of the transformer. In this preferred embodiment of the power converter, there is also provided a primary waveform sensor and a secondary waveform sensor. The primary waveform sensor is preferably a sense winding on the primary side of the transformer, and the secondary waveform sensor is preferably a sense winding on the secondary side of the transformer.

Also disclosed is a method of power conversion comprising: regulating output power by varying the duty cycle of a primary power switch; switching a secondary side power switch in accordance with the waveform of a transformer connected between the primary and secondary side power switches.

The above and other objects, aspects, features and advantages of the invention will be more readily apparent from the description of the preferred embodiments thereof taken in conjunction with the accompanying drawings and appended claims.

BRIEF DESCRIPTION OF THE DRAWINGS

The invention is illustrated by way of example and not limitation and the figures of the accompanying drawings in which like references denote like or corresponding parts, and in which.

DESCRIPTION OF THE PREFERRED EMBODIMENTS

Figure 1:
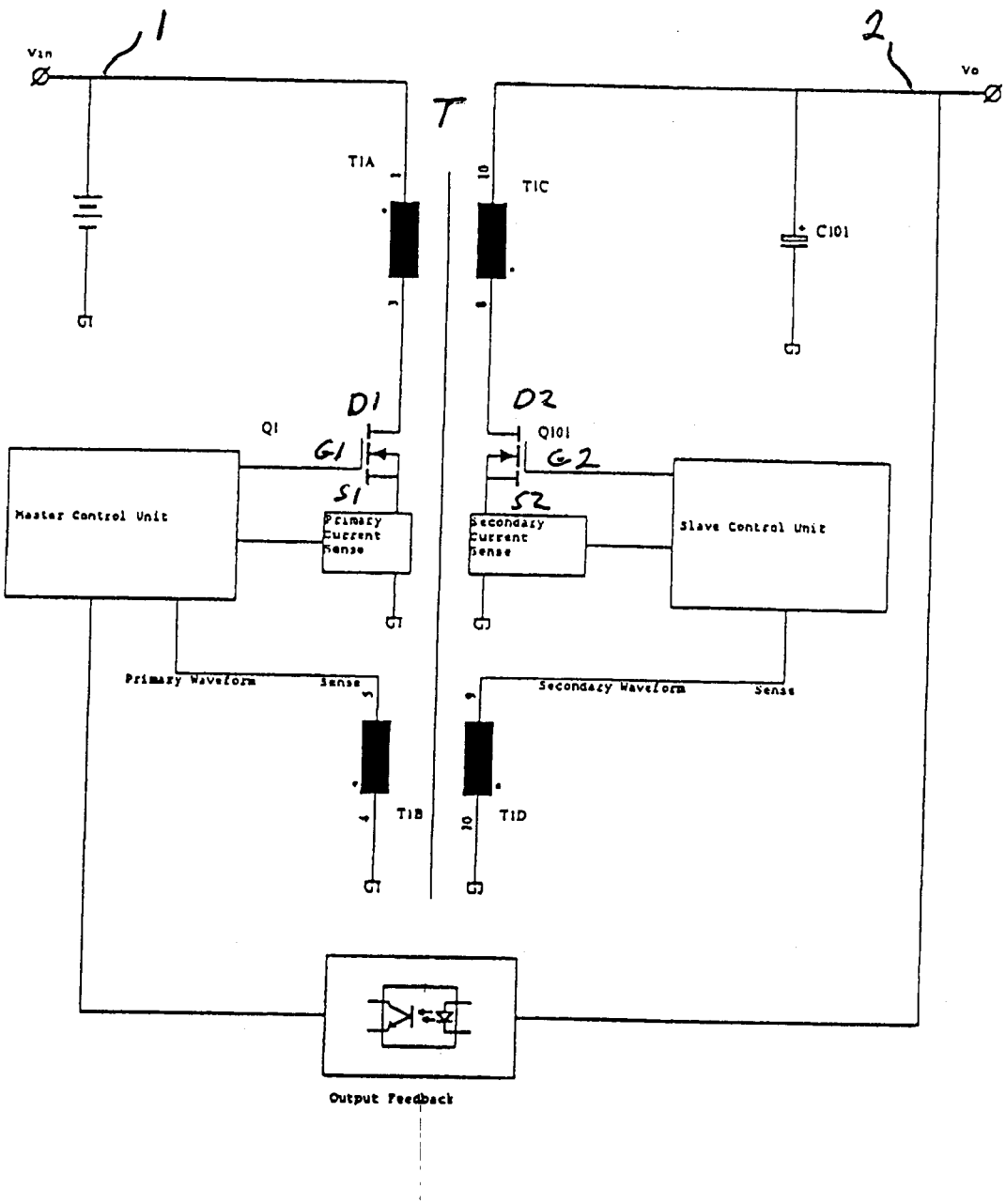
FIG. 1 is a schematic block diagram of the power converter in accordance with the invention.

Referring to FIG. 1, a power converter in accordance with the invention receives power from a source at terminal 1 having a voltage Vin which supplies current to a primary winding T1A of a transformer T when a primary master switch Q1 is on. The primary master switch Q1 is coupled between the transformer primary winding T1A and ground G1 via a primary current sense. The primary current sense is optional. The power converter outputs power at terminal 2 having an output voltage Vo. The output power of the power converter is dependent upon the duty cycle of the primary master switch Q1. The transformer T further includes a secondary winding T1C. A secondary slave switch Q101 is connected between the secondary winding of the transformer T and ground G2 via a secondary current sense. The secondary current from the transformer secondary winding T1C is delivered when the secondary slave switch Q101 is turned on. The secondary side of the power converter further includes an output capacitor C101 connected between the output terminal and ground. The primary current may be sensed by the primary current sense which delivers a signal to a master control unit which controls the on and off switching of the primary master switch Q1. The secondary current is sensed by the secondary current sense which delivers a signal to the slave control unit for controlling the switching operation of the secondary slave switch Q101. The power converter further includes a primary waveform sensor including a primary sense winding T1B which inputs a signal to the master control unit. The power converter further includes a secondary waveform sensor which includes a secondary sense winding T1D which provides a signal to the slave control unit. Additionally, the output voltage Vo is fed back to the master control unit. The feedback circuit may include an optical diode and sensor.

Figure 2:
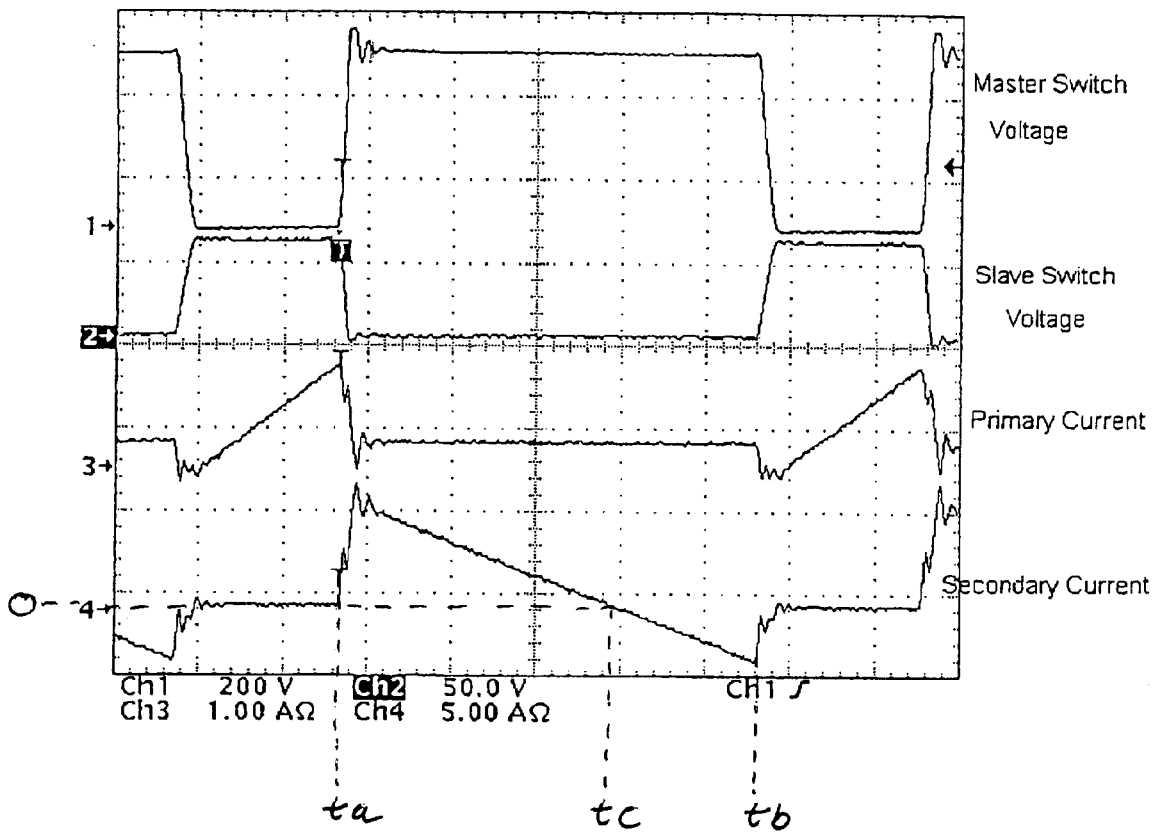
FIG. 2 is a chart showing the waveforms of the drain voltages of the primary master and secondary slave switches as well as the primary and secondary current through the transformer.

FIG. 2 is a chart showing the waveforms associated with the power converter illustrated in FIG. 1. More particularly, waveform 1 is the master switch voltage. This is the voltage MSV at the drain D1 of the primary master switch Q1 illustrated in FIG. 1. Waveform 2 illustrates the slave switch voltage which is the voltage at the drain D2 of the secondary side switch Q101. Waveform 3 is the primary current through the primary winding T1A of the transformer T. A positive current is in the direction from the voltage source to the primary master switch Q1. Waveform 4 is the secondary current through the secondary winding T1C of the transformer T. A positive current is in the direction from the secondary slave switch Q101 to the output terminal. As is clear from the waveforms in FIG. 2, the power converter according to the invention achieves zero voltage switching on both the primary and secondary sides, i.e., the voltage at the drain of the switches Q1 and Q101 is zero at the time the switching takes place. This increases the efficiency of the power converter.

The invention is a variable frequency flyback converter, having primary and secondary switches Q1 and Q101, respectively, featuring full zero voltage switching on both switches, combined with synchronous rectification in order to achieve a substantially higher conversion efficiency than a conventional flyback converter.

The primary master switch Q1 and the secondary slave switch Q101 are shown as MOSFETS (metal-oxide semiconductor field-effect transistors), although other types of transistors such as bipolar junction power transistors, BJT's or IGBT transistors may be used. FET's are preferred because they can accommodate higher switching frequencies than most bipolar power transistors.

The invention includes two separate control units (the master control unit and the slave control unit) for controlling respectively the primary master switch and the secondary slave switch. The master control unit and the slave control unit operate independently and stand alone. There is no need for a second transformer in the power converter of the invention for control purposes. This eliminates any requirement to meet safety standards or regulations that may require a clearance of 4000 V or more between the primary and secondary side of a second transformer. No control signals go over the isolation barrier except the feedback through the opto-coupler.

The slave control unit on the secondary side of the invention follows the waveform of the transformer T to accomplish the master-to-slave switching operation. As described more fully below, the slave control unit detects when the transformer's waveform reaches the zero voltage level and, after a predetermined time delay, switches the secondary side switch on. The secondary side (slave) control unit allows the secondary winding of the transformer to be charged in a reverse direction, by a backflow current from the output capacitor C101, to a particular level and then switches the secondary side switch off, thereby enabling the transformer to be charged in the positive direction once again.

As can be seen in the waveforms of FIG. 2, when the master primary switch Q1 is on, the secondary slave switch Q101 is off and vice a versa. When the master primary switch Q1 is turned on, the current in the primary transformer winding T1A rises linearly and energy is stored in the transformer T. At the moment that the master primary switch Q1 switches off, a part of the energy stored in the transformer T is used to charge the intrinsic output capacitance Cds1 of the primary master switch Q1 and discharge the intrinsic output capacitance Cds2 of the secondary slave switch Q101, causing the drain voltage of the secondary slave switch Q101 shown as waveform 2 in FIG. 2 to substantially reach zero. This is the zero voltage switching condition for the secondary slave switch Q101. At that moment, the secondary slave switch Q101 is switched on by the slave control unit, enabling the transformer T to discharge its stored energy through the secondary slave switch Q101 to the output capacitor C101. After the transformer T is completely discharged, the secondary slave switch Q101 remains on, causing some of the energy in the output capacitor C101 to flow back into the transformer T and charge the transformer T in the opposite direction. The secondary current sense is used to measure the amplitude of the reverse current in transformer T. The slave control unit switches off the secondary slave switch Q101 at the moment that the energy stored in the transformer T is equal to or greater than the energy required to charge the intrinsic output capacitance Cds2 of the secondary slave switch Q101 and discharge the intrinsic output capacitance Cds1 of the primary master switch Q1. After the intrinsic output capacitance of the primary master switch Q1 has been discharged and the voltage reaches zero, the primary master switch is turned on by the master control unit. This is the zero switching condition for the primary master switch Q1.

The master control unit determines the amount of energy stored in transformer T and consequently the power throughput of the converter by means of the on-time of the primary master switch Q1. The slave control unit determines the on-time of the secondary slave switch Q101 based on the zero voltage switching edge of the secondary slave switch Q101, the discharge time of the transformer T and the required reverse charge time of the transformer T in order to achieve zero voltage switching for the primary master switch Q1.

Since the power throughput of the converter is dependant upon the charge and discharge times of the transformer T, the switching frequency is inversely related to the output power. The master-slave flyback converter of the invention is a variable frequency type converter.

In the converter of the invention, the discharge current to the output capacitor C101 flows through the secondary slave switch Q101 instead of a rectifier diode as is the case in a conventional flyback converter. Therefore, the conduction losses in the output rectifier are only determined by the on-state resistance of the secondary slave switch Q101 and not by the threshold voltage of an output rectifier diode as is the case in a conventional flyback converter. The secondary slave control unit controls the on and off states of the secondary slave switch Q101 synchronous to the transformer waveform, causing the secondary slave switch Q101 to act like a synchronous rectifier.

Figure 3:
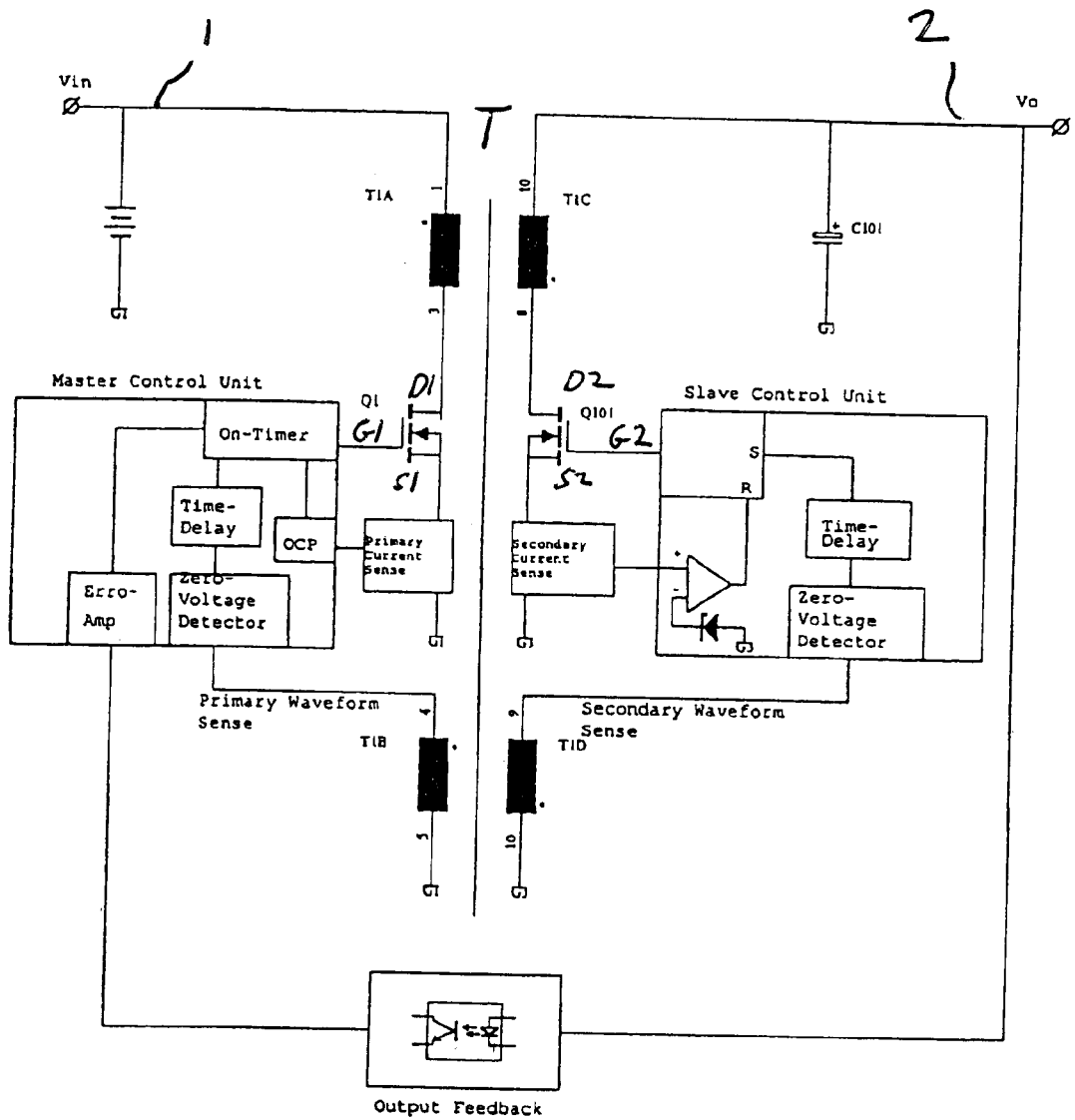
FIG. 3 is a block diagram similar to FIG. 1 but showing the master and slave control units in more detail.

FIG. 3 is similar to FIG. 1 but further illustrates the master control unit and slave control unit in detail. The master control unit includes an on-timer, a time delay, a zero voltage detector, an error amplifier, and an OCP (over current protection) circuit. The OCP circuit is optional along with the primary current sense of the power converter. The on-timer controls the switching of the primary master switch Q1. The output feedback from the output terminal is fed to the error amplifier. The amplified error signal is input to the on-timer. The output from the primary waveform sensor which comprises the primary sense winding T1B is input to the zero-voltage detector. The output of the zero-voltage detector is time delayed and input to the on-timer. The primary current sense is connected between the source S1 of the primary master switch Q1 and ground. The output from the primary current sense is input to the OCP circuit which outputs a signal to the on-timer. Based upon the signals from the error amplifier, the time delayed signal from the zero voltage detector and the signal from the OCP circuit (if present), the on-timer controls the switching of the primary master switch Q1.

The slave control unit includes a set/reset flip flop having a set input and a reset input. The slave control unit further includes a zero voltage detector, a time delay, a comparator and reference source. The signal from the secondary waveform sensor which is a secondary sense winding T1D is input to the zero voltage detector. The output from the zero voltage detector is time delayed by the time delay and input to the set terminal of the flip flop. The secondary current sense is located between the source S2 of the secondary slave switch Q101 and ground. The secondary current sense delivers a signal to the positive input of an operational amplifier which operates as the comparator of the slave control unit. The inverted input of the operational amplifier receives a reference signal. The reference signal may be established by a reference diode such as a Zener diode, a resistor or a battery or any other known manner of creating a reference signal. The output of the comparator is input to the reset terminal of the flip flop. Accordingly, when the secondary current exceeds the reference level set by the slave control unit and in particular the reference value delivered to the comparator, the flip flop controlling the switching of the secondary slave switch Q101 to transition the switch Q101.

Figure 4:
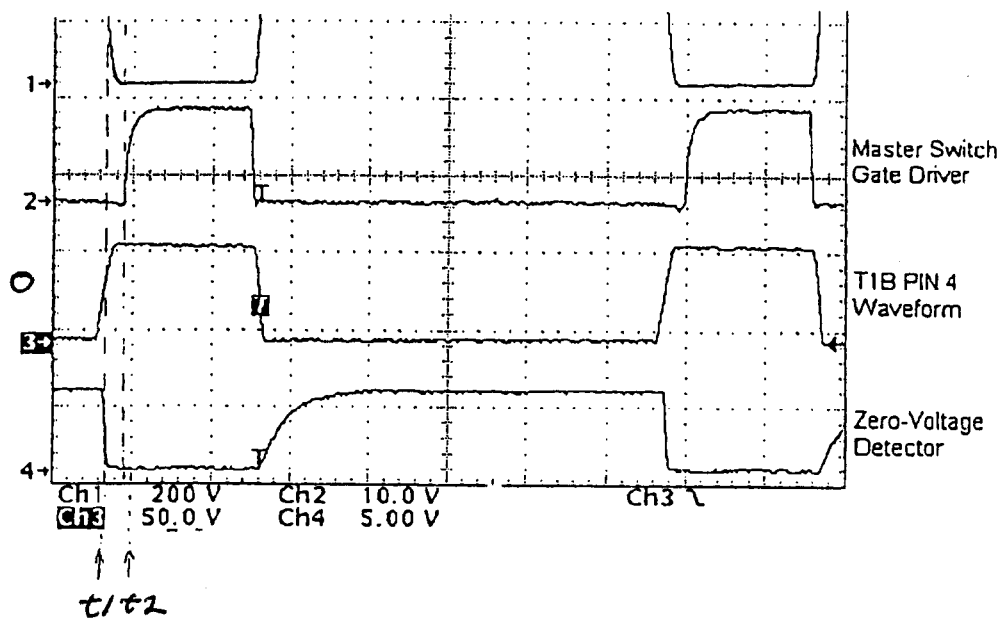
FIG. 4 is a chart showing waveforms associated with the control of the master control unit.

FIG. 4 is a chart showing the waveforms for the operation of the master control unit. Waveform 1 of FIG. 4 is the master switch drain voltage and is identical to waveform 1 of FIG. 2. Waveform 2 is the master switch gate driver, i.e. the voltage which is delivered to the gate G1 of the primary master switch Q1. Waveform 3 is the T1B Pin 4 waveform which is the waveform at the terminal pin 4 of the primary sense winding T1B which is sent to the master control unit. Waveform 4 is the output of the zero voltage detector of the master control unit. The output of the zero voltage detector transitions low at time t1 when the T1B Pin 4 waveform crosses zero volts as shown by waveform 3. The output of the zero voltage detector is delayed until time t2 by the time delay of the master control unit at which time the master switch gate driver transitions to switch the primary master switch Q1.

Figure 5:
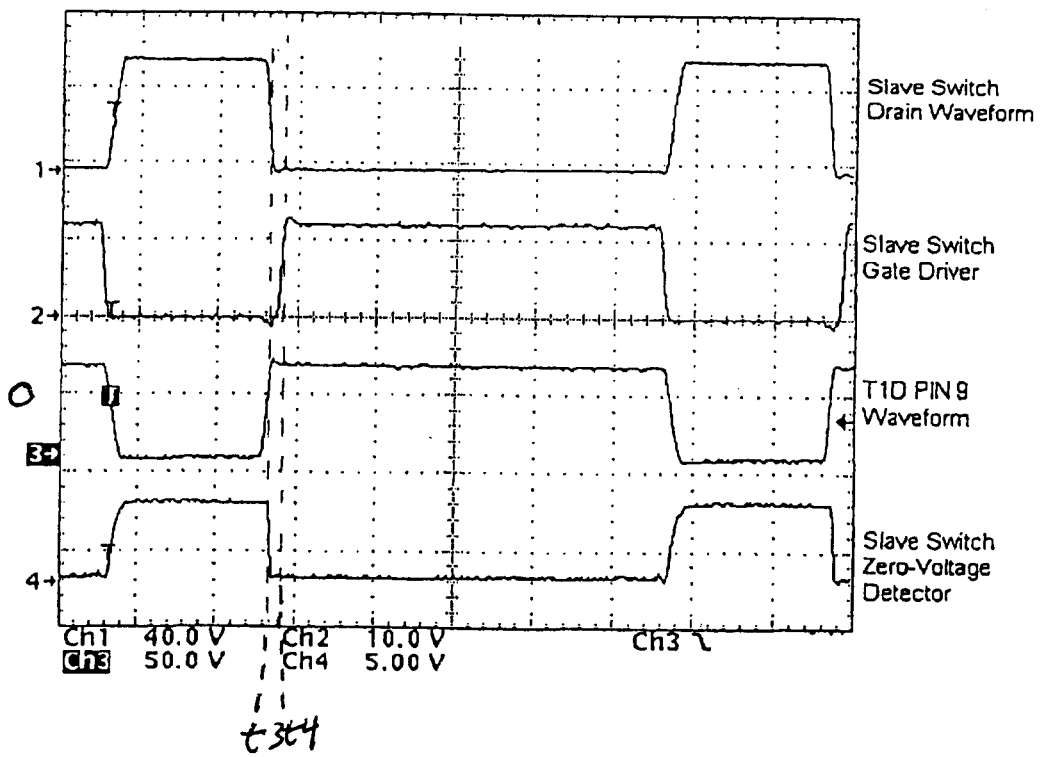
FIG. 5 is a chart showing waveforms associated with the control of the slave control unit.

FIG. 5 is a chart showing the waveforms for the operation of the slave control unit. Waveform 1 of FIG. 5 is the slave switch drain waveform and is identical to waveform 2 of FIG. 2. Waveform 2 of FIG. 5 is the slave switch gate driver, i.e. the voltage which is delivered to the gate G2 of the secondary slave switch Q101. Waveform 3 is the T1D Pin 9 waveform which is the waveform at the terminal pin 9 of the secondary sense winding T1D which is sent to the slave control unit. Waveform 4 is the output of the zero voltage detector of the slave control unit. The output of the zero voltage detector transitions low at time t3 when the T1D Pin 9 waveform crosses zero volts as shown by waveform 3. The output of the zero voltage detector is delayed until time t4 by the time delay of the slave control unit at which time the slave switch gate driver transitions to switch the secondary slave switch Q101.

Converter Cycle

The cycle of the converter of the invention shown in FIG. 1 will now be explained in detail. When primary master switch Q1 is switched on, the transformer T charges. When the primary master switch Q1 is switched off, the intrinsic capacitance of the secondary slave switch Q101 discharges generating the zero voltage switching condition for the secondary slave switch Q101. The secondary slave switch Q101 is switched on at a time determined as set forth below.

When the secondary slave switch Q101 is switched on, the transformer T discharges and ultimately the charge from output capacitor C101 flows into the transformer T as a backflow which charges the transformer. The secondary slave switch Q101 is switched off at a time determined as set forth below. The intrinsic capacitance of primary master switch Q1 discharges generating the zero voltage switching condition for primary master switch Q1 which is then switched on and the cycle repeats.

Determination of Time for Slave Switch Q101 Switching On

The time that the secondary slave switch Q101 is turned on is shown as to in FIG. 2. The signal shown as waveform 3 of FIG. 5 from secondary sense winding T1D is used to derive the time for switching the secondary slave switch Q101 on. The T1D Pin 9 waveform is input to the zero voltage detector of the slave control unit and the zero voltage detector transitions its output at time t3 when the T1D Pin 9 waveform crosses the zero volts level. The output of the zero voltage detector is input to the time delay and delayed by a time t4. At time t4 the signal from the time delay is input to the set input of the set/reset flip flop. The set/reset flip flop outputs a signal G2 (the slave switch gate driver signal waveform 2 of FIG. 5) that controls the switching of the secondary slave switch Q101 which is switched on. The secondary slave switch Q101 remains on until it is determined by the slave control unit to switch it off.

Determination of Time for Slave Switch Q101 Switching Off

The time that the secondary slave switch Q101 is turned off is shown as tb in FIG. 2. With reference to waveform 4 of FIG. 2, during the period when the secondary slave switch Q101 is on the current through the secondary slave switch Q101 is positive and at a high level initially but tapers down and eventually becomes negative. A positive current flows in the direction of from the source S2 to the drain D2 to the transformer secondary winding T1C to the output capacitor C101. When the secondary current shown in the waveform 4 of FIG. 2 is negative, the output capacitor C101 discharges to the transformer T. The output capacitor is a value sufficiently large to be considered an infinitely large capacitor.

The secondary current sense detects when the current through the secondary slave switch goes negative which is shown as time tc on FIG. 2. When the back flow current reaches a threshold, the secondary slave switch Q101 is switched off. More particularly, the output from the secondary current sense is input to the slave control unit to a comparator within the slave control unit. If the back flow current exceeds a reference level, which is set to be the optimum level for switching to provide efficient power conversion, the comparator outputs a signal to reset the set/reset flip flop. Consequently, the flip flop outputs a signal G2 to switch off the secondary slave switch Q101. The comparator is an op amp with a positive input and a negative input. The output of the secondary current sense is input to the positive input of the comparator and is compared to a reference level input to the negative input. The reference source is illustrated as a reference diode. Any known manner of generating a reference signal may be provided.

Figure 6:
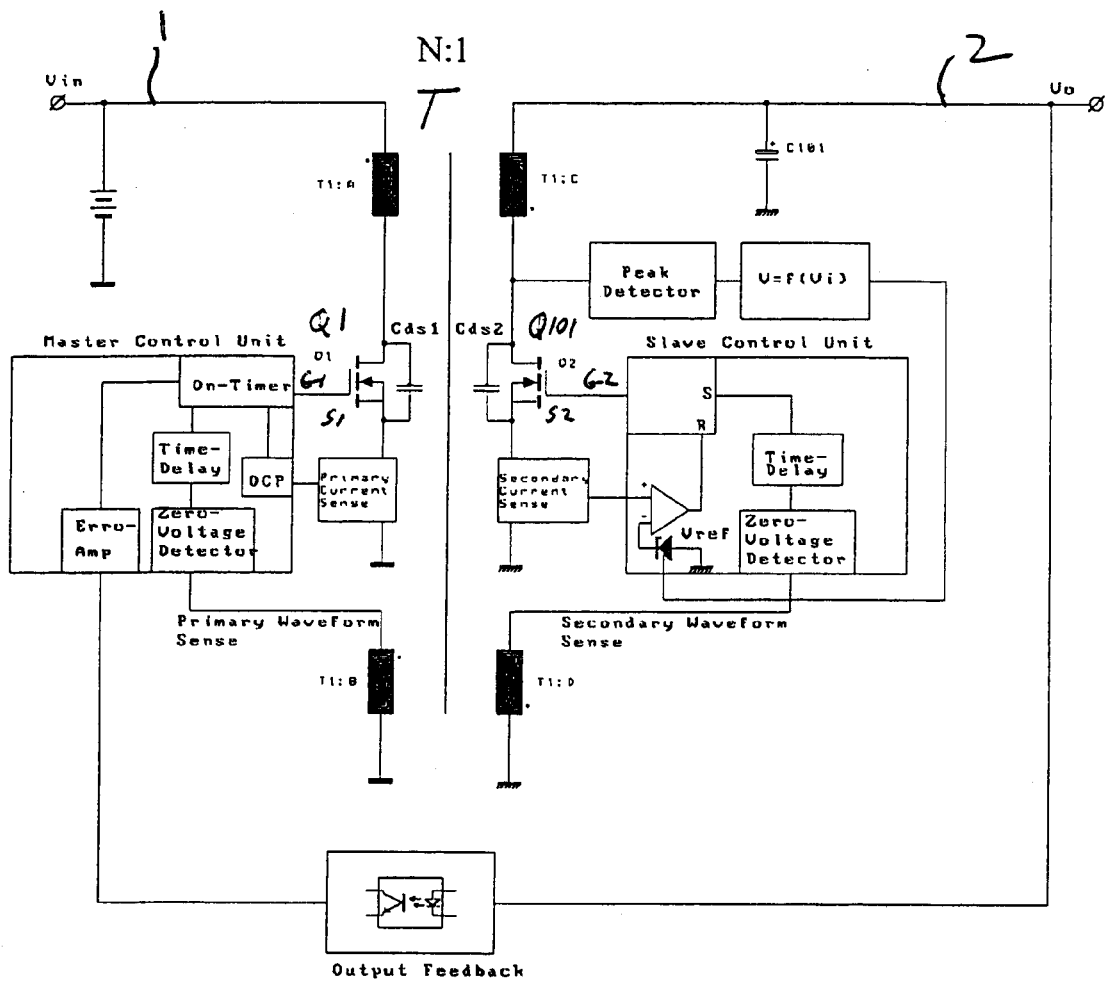
FIG. 6 is a schematic block diagram of the power converter in accordance with another embodiment of the invention similar to the embodiment shown in FIG. 1 but further including circuitry to control the reference voltage of the current sense comparator of the slave control unit.

FIG. 6 shows another embodiment of the invention similar to the embodiment shown in FIG. 1 but further includes circuitry to control the reference voltage of the current sense comparator of the slave control unit. Additionally, the intrinsic output capacitances Cds1 and Cds2 of the primary master switch and the secondary slave switch, respectively, are shown.

The following equation establishes the reference level for reverse current $I_{reverse}$ to obtain optimum switching efficiency at an optimum current for switching which is determined exactly:

$$I_{reverse}=(Vin+Vo*N)*\sqrt{[(Cds_{1+Cds_{2/N^2}/L_{T1C}})]}$$

where $L_{T1C}$ is the inductance of the secondary winding T1C of the transformer T and where N is the winding ratio between primary and secondary windings T1A and T1C. Thus, the reference level depends upon the input voltage. The amount of back flow must be sufficient to discharge the intrinsic capacitances of the primary master switch Q1 and the secondary slave switch Q101. Otherwise zero voltage switching can not be achieved and energy is wasted.

FIG. 6 shows a peak detector connected to the secondary winding T1C of the transformer T and to a transfer function having input voltage Vi and output voltage V. The transfer function output controls the reference voltage of the current sense comparator of the slave control unit. The switch-off criterion for secondary slave switch Q101 depends on Vo and Vin of the converter. The output voltage Vo will normally be constant because it is regulated by the feedback loop. The input voltage Vin, however, can vary, which means that the switch-off reverse current for secondary slave switch Q101 changes with the input voltage Vin on the converter. By adding a peak detector on the secondary winding T1C, a voltage at the output of the peak detector is obtained which is a function of the sum of Vo and Vin/N. By controlling the switch-off reverse current of secondary slave switch Q101 as a function of the output voltage of the peak detector, the switch-off criterion can be met at every input voltage (Vin) and output voltage (Vo) of the converter. Since the switch-off reverse current of secondary slave switch Q101 has a non-linear relation to both input voltage Vin and output voltage Vo, the output voltage of the peak detector must be fed to the reference voltage through a transfer function, here represented as V=f(Vi).

The transfer function may be formed of a diode, transistor or other component such as a multiplier which provided the non-linear function.

Each of the primary current sense and the secondary current sense may be formed by a transformer, resistor or Hall sensor or any other suitable device.

Also contemplated is a method of power conversion including zero voltage switching of primary and secondary switches and switching the secondary switch in accordance with the waveform of the transformer of the converter. The secondary slave switch is switched on in accordance with falling edge of the primary master switch after a delay to ensure zero voltage switching of the secondary slave switch. The secondary slave switch is switched off when the back flow current exceeds a threshold level which is set for optimum switching time and efficiency of the converter.

Although the invention has been described with reference to the preferred embodiments, it will be apparent to one skilled in the art that variations and modifications are contemplated within the spirit and scope of the invention. The drawings and description of the preferred embodiments are made by way of example rather than to limit the scope of the invention, and it is intended to cover within the spirit and scope of the invention all such changes and modifications.

What is claimed is:

1. A power converter comprising:
    an input terminal;
    an output terminal;
    a transformer having a primary side and a secondary side, said transformer further comprising a primary side winding connected to said input terminal and a secondary side winding connected to said output terminal;
    a primary side switch;

a secondary side switch;

a slave control unit controlling switching of said secondary side switch;

a master control unit controlling switching of said primary side switch; and a secondary current sense detecting said secondary current in said secondary side switch, said primary side switch and said secondary side switch being configured to be switched on and off alternately; wherein said switching of said secondary side switch is accomplished depending on a secondary current detected in said secondary side switch, and wherein said primary side switch and said secondary side switch are switched on during a zero voltage switching condition;

wherein said slave control unit further comprises a comparator and a set/reset flip flop, wherein said secondary current sense conveys an output signal into said comparator when said secondary current becomes negative, wherein said comparator compares said output signal of said secondary current sense to a current reference level and outputs a switching signal to said set/reset flip flop when said output signal of said secondary current sense exceeds said current reference level, wherein said set/reset flip flop switches said secondary side switch when said switching signal is received and wherein said current reference level is given by the following equation:

$$I_{reverse}=(Vin+Vo*N)*\sqrt{[(Cds_1+Cds_2/N^2)/L_{T1C}]}$$

wherein $I_{reverse}$ is said current reference level, $L_{T1C}$ is an inductance of said secondary side winding of said transformer, $Cds_1$ is an intrinsic capacitance of said primary side switch, $Cds_2$ is an intrinsic capacitance of said secondary side switch, Vin is an input voltage, Vo is an output voltage and N is a winding ratio between said primary and said secondary side windings.

2. A power converter according to claim 1, wherein said switching signal is a reset signal switching said secondary side switch off.

3. A power converter according to claim 1 further comprising a secondary waveform sensor detecting a waveform generated by said transformer, said secondary waveform sensor being a sense winding on said secondary side of the transformer.

4. A power converter according to claim 3 wherein said secondary side switch is switched on in accordance with said waveform of said transformer.

5. A power converter according to claim 1 further comprising an output capacitor.

6. A power converter according to claim 1, wherein said secondary side switch further comprises an intrinsic output capacitance and wherein said zero voltage switching condition is generated when said intrinsic output capacitance is discharged.

7. A power converter according to claim 1, wherein said primary side switch further comprises an intrinsic capacitance and wherein said zero voltage switching condition is generated when said intrinsic output capacitance is discharged.

8. A power converter according to claim 1 further comprising an output feedback circuitry connected between said output terminal and said master control unit, said output feedback circuitry generating an output feedback signal.

9. A power converter according to claim 8, wherein said master control unit further comprises an on-timer, a time-delay circuitry, a zero voltage detector and an error-amplifier, wherein said output feedback signal is fed into said error-amplifier, said error-amplifier producing an amplified error signal, and wherein said amplified error signal is fed into said on-timer, said on-timer controlling switching of said primary side switch.

10. A power converter according to claim 1 further comprising a primary current sense for detection of a primary current in said primary side switch.

11. A power converter comprising:

a transformer having a primary side and a secondary side;

a primary side switch;

a secondary side switch;

a slave control unit controlling switching of said secondary side switch;

a master control unit controlling switching of said primary side switch; and a secondary current sense detecting a secondary current in said secondary side switch;

wherein said switching of said secondary side switch is accomplished depending on said secondary current detected in said secondary side switch, wherein said primary side switch and said secondary side switch are switched on during a zero voltage switching condition; wherein said slave control unit further comprises a comparator and a set/reset flip flop, wherein said secondary current sense conveys an output signal into said comparator when said secondary current becomes negative, wherein said comparator compares said output signal of said secondary current sense to a current reference level and outputs a switching signal to said set/reset flip flop when said output signal of said secondary current sense exceeds said current reference level; wherein said set/reset flip flop switches said secondary side switch when said switching signal is received; wherein said current reference level is given by the following equation:

$$I_{reverse}=(Vin+Vo*N)\sqrt{[(Cds_1Cds_2/N^2)/L_{T1C}]}$$

wherein $I_{reverse}$ is said current reference level, $L_{T1C}$ is an inductance of a secondary winding of said transformer, $Cds_1$ is an intrinsic capacitance of said primary side switch, $Cds_2$ is an intrinsic capacitance of said secondary side switch, Vin is an input voltage, Vo is an output voltage and N is a winding ratio between a primary side winding and said secondary side winding of said transformer.

12. A power converter according to claim 11, wherein said switching signal is a reset signal switching said secondary side switch off.

13. A power converter according to claim 11, further comprising a secondary waveform sensor detecting a waveform generated by said transformer, said secondary waveform sensor being a sense winding on said secondary side of the transformer.

14. A power converter according to claim 13, wherein said secondary side switch is switched on in accordance with said waveform of said transformer.

15. A power converter according to claim 13, wherein said slave control unit is configured to switch said secondary side switch on within a predetermined time delay after said slave unit detects a zero level of said waveform.

16. A power converter according to claim 11 further comprising an output capacitor.

17. A power converter according to claim 11, wherein said secondary side switch further comprises an intrinsic output capacitance and wherein said zero voltage switching condition is generated when said intrinsic output capacitance is discharged.

18. A power converter according to claim 11, wherein said primary side switch further comprises an intrinsic capacitance and wherein said zero voltage switching condition is generated when said intrinsic output capacitance is discharged.

19. A power converter according to claim 11, further comprising an output terminal and an output feedback circuitry connected between said output terminal and said master control unit, said output feedback circuitry generating an output feedback signal.

20. A power converter according to claim 19, said master control unit further comprises an on-timer, a time-delay circuitry, a zero voltage detector and an error-amplifier, wherein said output feedback signal is fed into said error-amplifier, said error-amplifier producing an amplified error signal, and wherein said amplified error signal is fed into said on-timer, said on-timer controlling switching of said primary side switch.

21. A power converter according to claim 11 further comprising a primary current sense for detection of a primary current in said primary side switch.

* * * * *